United States Patent
Liu et al.

(10) Patent No.: US 8,942,092 B2
(45) Date of Patent: Jan. 27, 2015

(54) GATEWAY DATA TRANSMISSION METHOD, DEVICE AND SYSTEM

(71) Applicant: Huawei Technologies Co., Ltd., Shenzhen, Guangdong (CN)

(72) Inventors: Yongjun Liu, Shenzhen (CN); Hui Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 13/847,897

(22) Filed: Mar. 20, 2013

(65) Prior Publication Data

US 2013/0215755 A1 Aug. 22, 2013

Related U.S. Application Data

(63) Continuation of application No. PCT/CN2011/074400, filed on May 20, 2011.

(30) Foreign Application Priority Data

Sep. 28, 2010 (CN) .......................... 2010 1 0294828

(51) Int. Cl.
*H04L 12/26* (2006.01)
*H04Q 7/00* (2006.01)
(Continued)

(52) U.S. Cl.
CPC ........ *H04W 28/0289* (2013.01); *H04W 76/027* (2013.01); *H04W 88/16* (2013.01)
USPC ............................................ 370/230; 370/328

(58) Field of Classification Search
None
See application file for complete search history.

(56) References Cited

U.S. PATENT DOCUMENTS 6,842,424 B1 * 1/2005 Key et al. ................ 370/236
8,675,489 B2 * 3/2014 Ronneke et al. ............. 370/235
(Continued)

FOREIGN PATENT DOCUMENTS

CN 1545251 A 11/2004
CN 1759542 A 4/2006
(Continued)

OTHER PUBLICATIONS

"Machine-to-Machine Communications (M2M); M2M Service Requirements," Draft ETSI TS 102 689 V0.2.1, 2009, European Telecommunications Standards Institute, France.
(Continued)

*Primary Examiner* — Hong Cho
(74) *Attorney, Agent, or Firm* — Leydig, Voit & Mayer, Ltd.

(57) ABSTRACT

A gateway data transmission method, device and system are provided, which relate to the field of communication, and involve solving data congestion in a dual mode gateway caused by occupation of resources of the dual mode gateway in existing gateway data transmission technology. The method provided in the present disclosure includes: when service data from a cellular network side needs to be transmitted to a capillary vessel network device via a dual mode gateway, it is determined if the dual mode gateway is congested; if it is congested, a delay transmission message is transmitted to a data transmission main body at the cellular network side, the delay transmission message includes a reaccess time evaluated for service data by the dual mode gateway, the data transmission main body delays the transmission of the service data. The present disclosure can be applied in communication between all sorts of different networks.

15 Claims, 9 Drawing Sheets

(51) Int. Cl.
*H04W 28/02* (2009.01)
*H04W 76/02* (2009.01)
*H04W 88/16* (2009.01)

(56) References Cited

U.S. PATENT DOCUMENTS

| | | |
|---|---|---|
| 2003/0161334 A1* | 8/2003 | Pellert .......................... 370/401 |
| 2004/0052212 A1 | 3/2004 | Baillargeon |
| 2004/0180677 A1 | 9/2004 | Harris et al. |
| 2005/0141419 A1 | 6/2005 | Bergamasco et al. |
| 2006/0045016 A1 | 3/2006 | Dawdy et al. |
| 2007/0071018 A1 | 3/2007 | Laboy et al. |
| 2007/0165656 A1 | 7/2007 | Dobrowski et al. |
| 2007/0268858 A1* | 11/2007 | Soto .............................. 370/328 |
| 2009/0172117 A1 | 7/2009 | Bedi et al. |
| 2009/0199268 A1 | 8/2009 | Ahmavaara et al. |

FOREIGN PATENT DOCUMENTS

| | | |
|---|---|---|
| CN | 1778079 A | 5/2006 |
| CN | 101114969 A | 1/2008 |
| CN | 101300789 A | 11/2008 |
| CN | 101640894 A | 2/2010 |
| WO | WO 2009085295 A1 | 7/2009 |

OTHER PUBLICATIONS

International Search Report in corresponding PCT Patent Application No. PCT/CN2011/074400 (Aug. 11, 2011).

* cited by examiner

GATEWAY DATA TRANSMISSION METHOD, DEVICE AND SYSTEM

CROSS-REFERENCE TO RELATED APPLICATION

This application is a continuation of International Application No. PCT/CN2011/074400, filed on May 20, 2011, which claims priority to Chinese Patent Application No. 201010294828.4, filed on Sep. 28, 2010, entitled "Gateway Data Transmission Method," both of which are hereby incorporated by reference in their entireties.

FIELD OF THE TECHNOLOGY

The present disclosure relates to the field of communication and, particularly, to a gateway data transmission method, device and system.

BACKGROUND

In many Machine-to-Machine (M2M) applications, a dual mode gateway, such as, for example, a Machine Type Communications (MTC) device, is used to connect a cellular network and a capillary vessel network. The so-called capillary vessel network is a communication network having an independent topological structure and is different from the general cellular network, such as a WiFi network or a wireless sensor network. The dual mode gateway simultaneously supports the communication technologies of the capillary vessel network and the cellular network. In the capillary vessel network, the dual mode gateway may serve as the gateway of the capillary vessel network to connect the external network through the cellular network. While in the cellular network, the dual mode gateway just acts as an ordinary User Equipment (UE).

The capillary vessel network device usually periodically sleeps to reduce the energy consumption, and the sleeping cycle varies from a few seconds to several hours. During the maintenance of the capillary vessel network, the dual mode gateway can easily acquire the sleeping cycle of the capillary vessel network device. Based on this characteristic of the capillary vessel network device, a M2M application requires that data can be transmitted to the capillary vessel network device after it awakes.

Since the cellular network and the capillary vessel network are connected to each other via the dual mode gateway, the service data transmitted by the M2M application to the capillary vessel network device is forwarded by the dual mode gateway. In the following manner, the existing M2M application transmits the service data to the capillary vessel network device via the dual mode gateway: the M2M application transmits, to the dual mode gateway at any time, the service data to be transmitted to the capillary vessel network device; the dual mode gateway stores the service data and transmits to the capillary vessel network device after it awakes.

During the implementation of dual mode gateway data forwarding, the inventor finds that the prior art at least has the following deficiency: the buffer space of the dual mode gateway is occupied in the current data forwarding by the dual mode gateway, and when too many devices in the capillary vessel network fall in sleep, a great deal of resources of the dual mode gateway will be occupied, which causes a data congestion of the dual mode gateway.

SUMMARY

The embodiments of the present disclosure provide a gateway data transmission method, device and system, which can relieve the data congestion of the dual mode gateway and improve the data transmission efficiency of the dual mode gateway.

In order to achieve the above object, the embodiments of the present disclosure adopt the following technical solutions:

A gateway data transmission method, comprising:

determining whether a dual mode gateway is congested when service data from a cellular network side needs to be transmitted to a capillary vessel network device via the dual mode gateway; and transmitting a delay transmission message to a data transmission main body at the cellular network side if the dual mode gateway is determined to be congested, so that the data transmission main body at the cellular network side delays the transmission of the service data, wherein the delay transmission message includes a reaccess time evaluated for the service data by the dual mode gateway.

A gateway data transmission method, comprising:

transmitting, by a cellular core network, to a cellular access network a message that requests to establish a bearer between the cellular core network and the cellular access network, upon reception of service data from a server;

receiving and analyzing, by the cellular core network, a message returned by the cellular access network for responding to establishing a bearer between the cellular core network and the cellular access network; and delaying, by the cellular core network, transmission of the service data to the dual mode gateway when the message that responds to establishing a bearer between the cellular core network and the cellular access network comprises a delay transmission message.

A gateway data transmission method, comprising:

transmitting, by a cellular access network, to a dual mode gateway a message that requests to establish a wireless interface bearer between the cellular access network and the dual mode gateway, upon reception of a message that requests to establish a bearer between a cellular core network and the cellular access network from the cellular core network; and transmitting, by the cellular access network, to the cellular core network a message that responds to establishing a bearer between the cellular core network and the cellular access network, upon reception of a message that responds to establishing a wireless interface bearer between the cellular access network and the dual mode gateway from the dual mode gateway, wherein the message that responds to establishing a bearer between the cellular core network and the cellular access network comprises a delay transmission message if the dual mode gateway is congested at that time.

A dual mode gateway, comprising:

a determining module configured to determine whether the dual mode gateway is congested when service data from a cellular network side needs to be transmitted to a capillary vessel network device via the dual mode gateway; and a delay indicating module configured to transmit a delay transmission message to a data transmission main body at the cellular network side if the dual mode gateway is congested at that time, wherein the delay transmission message comprises a reaccess time evaluated for the service data by the dual mode gateway, such that the data transmission main body at the cellular network side delays the transmission of the service data.

A cellular core network, comprising:

a bearer request transmitting module configured to transmit to a cellular access network a message that requests to establish a bearer between the cellular core network and the cellular access network, upon reception of service data from a server;

an analyzing module configured to receive and analyze a message returned by the cellular access network for responding to establishing a bearer between the cellular core network and the cellular access network; and a delay transmitting module configured to delay the transmission of the service data to the dual mode gateway, when the message that responds to establishing a bearer between the cellular core network and the cellular access network comprises a delay transmission message.

A cellular access network, comprising:

a bearer establishment transmitting module configured to transmit to a dual mode gateway a message that requests to establish a wireless interface bearer between the cellular access network and the dual mode gateway, upon reception of a message that requests to establish a bearer between a cellular core network and the cellular access network from the cellular core network; and a bearer response transmitting module configured to transmit to the cellular core network a message that responds to establishing a bearer between the cellular core network and the cellular access network, upon reception of a message that responds to establishing a wireless interface bearer between the cellular access network and the dual mode gateway from the dual mode gateway, wherein the message that responds to establishing a bearer between the cellular core network and the cellular access network comprises a delay transmission message if the dual mode gateway is congested at that time.

A gateway data transmission system, comprising:

an MTC server configured to transmit service data to a cellular core network, so that the cellular core network transmits the service data to a dual mode gateway, wherein the destination device of the service data is a capillary vessel network device connected to the dual mode gateway;

the cellular core network configured to transmit to a cellular access network a message that requests to establish a bearer between the cellular core network and the cellular access network, upon reception of the service data from a server, and receive and analyze a message returned by the cellular access network for responding to establishing a bearer between the cellular core network and the cellular access network, and delay the transmission of the service data to the dual mode gateway if the message that responds to establishing a bearer between the cellular core network and the cellular access network comprises a delay transmission message;

the cellular access network configured to transmit to the dual mode gateway a message that requests to establish a wireless air interface bearer between the cellular access network and the dual mode gateway, upon reception of the message that requests to establish a bearer between the cellular core network and a cellular access network from the cellular core network, and transmit to the cellular core network the message that responds to establishing a bearer between the cellular core network and the cellular access network, upon reception of a message that responds to establishing a wireless air interface bearer between the cellular access network and the dual mode gateway from the dual mode gateway, wherein the message that responds to establishing a bearer between the cellular core network and the cellular access network comprises a delay transmission message if the dual mode gateway is congested at that time; and the dual mode gateway configured to receive from the cellular access network the message that requests to establish a wireless air interface bearer between the cellular access network and the dual mode gateway, and transmit to the cellular access network the message that responds to establishing a wireless air interface bearer between the cellular access network and the dual mode gateway, wherein the message that responds to establishing a wireless air interface bearer between the cellular access network and the dual mode gateway comprises a delay transmission message if the dual mode gateway is congested at that time.

A gateway data transmission method, comprising the steps of:

reporting sleep information to a MTC server, wherein the sleep information notifies the MTC server of the sleeping time and the waking time of the capillary vessel network device; and receiving service data forwarded by a dual mode gateway from the MTC server.

A gateway data transmission method, comprising the steps of:

receiving, by an MTC server, sleep information reported by a capillary vessel network device, wherein the sleep information comprises the sleeping time and the waking time of the capillary vessel network device; and transmitting, by the MTC server, service data to a dual mode gateway at the waking time of the capillary vessel network device, so that the dual mode gateway forwards the service data to the capillary vessel network device.

A capillary vessel network device, comprising:

a sleep information reporting module configured to report sleep information to an MTC server, wherein the sleep information notifies the MTC server of the sleeping time and the waking time of the capillary vessel network device; and a service data receiving module configured to receive service data forwarded by a dual mode gateway from the MTC server.

An MTC server, comprising:

a sleep information receiving module configured to receive sleep information reported by a capillary vessel network device, wherein the sleep information includes the sleeping time and the waking time of the capillary vessel network device; and a service data transmitting module configured to transmit service data to a dual mode gateway at the waking time of the capillary vessel network device, so that the dual mode gateway forwards the service data to the capillary vessel network device.

A gateway data transmission system, comprising:

a capillary vessel network device configured to report sleep information to an MTC server, and receive service data forwarded by a dual mode gateway from the MTC server, wherein the sleep information notifies the MTC server of the sleeping time and the waking time of the capillary vessel network device;

the MTC server configured to receive the sleep information reported by the capillary vessel network device, and transmit the service data to the dual mode gateway at the waking time of the capillary vessel network device; and the dual mode gateway configured to forward the service data from the MTC server to the capillary vessel network device.

The gateway data transmission method, device and system firstly determine whether the dual mode gateway is congested when the service data needs to be transmitted to the capillary vessel network device via the dual mode gateway, and transmit a delay transmission message to the data transmission main body at the cellular network side if the dual mode gateway is congested, so that the data transmission main body at the cellular network side delays the transmission of the service data. Thus, by means of delaying the transmission of data to the dual mode gateway, the data congestion of the dual mode gateway could be relived, and the data transmission efficiency of the dual mode gateway could be improved.

DETAILED DESCRIPTION

Detailed descriptions of the embodiments of the method, device and system of the present disclosure are given as follows with reference to the accompanying drawings.

Figure 1:
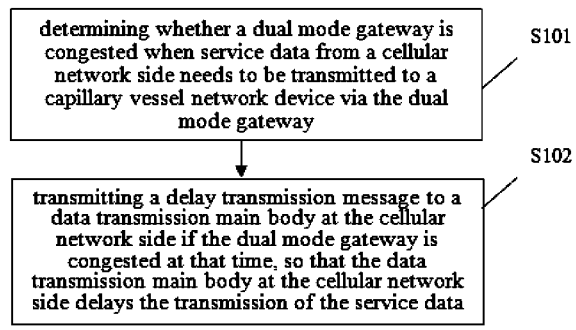
FIG. 1 is a flowchart of a gateway data transmission method according to a first embodiment of the present disclosure.

The gateway data transmission method according to the first embodiment of the present disclosure is applied to a dual mode gateway, as illustrated in FIG. 1, the method includes the steps of:

S101: determining whether the dual mode gateway is congested when service data from a cellular network side needs to be transmitted to a capillary vessel network device via the dual mode gateway.

The mode for determining whether the dual mode gateway is congested may be determined by an administrator based on the actual conditions, and herein four example methods are given to determine whether the dual mode gateway is congested:

Mode 1: it is determined that the dual mode gateway is congested if service data is transmitted to at least one sleeping capillary vessel network device, and the buffer of the dual mode gateway is full.

Mode 2: it is determined that the dual mode gateway is congested if the service data is transmitted to a sleeping capillary vessel network device or at least two sleeping capillary vessel network devices having the same sleeping cycle.

Mode 3: it is determined that the dual mode gateway is congested if the service data is transmitted to at least one sleeping capillary vessel network device.

Mode 4: it is determined that the dual mode gateway is congested if the service data is transmitted to a sleeping capillary vessel network device or at least two sleeping capillary vessel network devices having the same sleeping cycle, and the buffer of the dual mode gateway is full.

S102: transmitting to a data transmission main body at the cellular network side a delay transmission message if the dual mode gateway is congested, so that the data transmission main body at the cellular network side delays the transmission of the service data.

The data transmission main body at the cellular network side may be an MTC server, a cellular core network, or a cellular access network.

The delay transmission message includes a reaccess time evaluated for the service data by the dual mode gateway. The data transmission main body at the cellular network side pauses for a period after receiving the delay transmission message, and transmits the service data to the dual mode gateway at the reaccess time.

According to the embodiment of the present disclosure, the dual mode gateway initiatively requires a delay of the data transmission, thereby mitigating the data congestion of the dual mode gateway, and improving the data transmission efficiency of the dual mode gateway.

Figure 2:
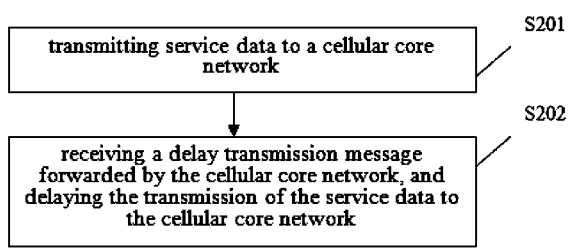
FIG. 2 is a flowchart of a gateway data transmission method according to a second embodiment of the present disclosure.

The gateway data transmission method according to the second embodiment of the present disclosure is applied to an MTC server, as illustrated in FIG. 2, the method includes the steps of:

S201: transmitting service data to a cellular core network.

The destination device of the service data is a capillary vessel network device connected to the dual mode gateway. The service data may be application layer data transmitted by various MTC servers to the capillary vessel network device. An MTC server transmits the service data to the cellular core network which, in turn, transmits the service data to a corresponding dual mode gateway, and the dual mode gateway forwards the service data to the destination device in the capillary vessel network.

S202: receiving a delay transmission message forwarded by the cellular core network, and delaying the transmission of the service data to the cellular core network.

If the dual mode gateway is congested after receiving the service data, the dual mode gateway forwards the delay transmission message to the MTC server through the cellular core network. After receiving the delay transmission message, the MTC server delays the transmission of the service data to the capillary vessel network device. The service data delayed for transmission by the MTC server may be the service data transmitted to a certain or a plurality of capillary vessel network devices connected to the congested dual mode gateway.

According to one embodiment of present disclosure, the delay transmission message may include a reaccess time evaluated for the service data by the dual mode gateway according to its congestion condition and progress in mitigation. The MTC server pauses for a period after receiving the delay transmission message, and transmits the service data to the dual mode gateway at the reaccess time.

In one embodiment of the present disclosure, the MTC server delays the transmission of data to the dual mode gateway, so that the dual mode gateway has certain time to process the congested data, thereby mitigating the data congestion of the dual mode gateway, and improving the data transmission efficiency of the dual mode gateway.

Figure 3:
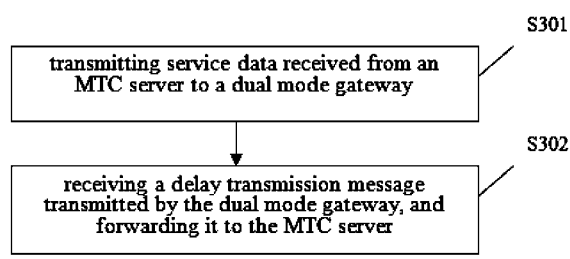
FIG. 3 is a flowchart of a gateway data transmission method according to a third embodiment of the present disclosure.

The gateway data transmission method according to the third embodiment of the present disclosure is applied to the cellular core network, as illustrated in FIG. 3, the method includes the steps of:

S301: transmitting service data received from an MTC server to a dual mode gateway.

The destination device of the service data is a capillary vessel network device connected to the dual mode gateway. The service data may be application layer data transmitted by various MTC servers to the capillary vessel network device. The cellular core network transmits the service data received from the MTC server to the dual mode gateway, and the dual mode gateway forwards the service data to the destination device in the capillary vessel network.

S302: receiving a delay transmission message transmitted by the dual mode gateway, and forwarding it to the MTC server.

If the dual mode gateway is congested after receiving the service data, the dual mode gateway forwards the delay transmission message to the MTC server through the cellular core network. After receiving the delay transmission message, the MTC server delays the transmission of the service data to the capillary vessel network device.

According to the embodiment of present disclosure, the delay transmission message may include a reaccess time evaluated for the service data by the dual mode gateway according to its congestion condition and progress in mitigation. The MTC server pauses for a period after receiving the delay transmission message, and transmits the service data to the dual mode gateway at the reaccess time.

In one embodiment of the present disclosure, the delay transmission message is forwarded to the MTC server through the cellular core network, thus the MTC server delays the data transmission to the dual mode gateway, so that the dual mode gateway has certain time to process the congested data, thereby mitigating the data congestion of the dual mode gateway, and improving the data transmission efficiency of the dual mode gateway.

Figure 4:
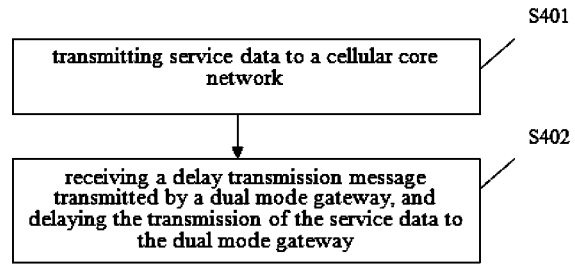
FIG. 4 is a flowchart of a gateway data transmission method according to a fourth embodiment of the present disclosure.

The gateway data transmission method according to the fourth embodiment of the present disclosure is applied to the MTC server, as illustrated in FIG. 4, the method includes the steps of:

S401: transmitting service data to a cellular core network.

This step has the same process as S201 in FIG. 2.

S402: receiving a delay transmission message transmitted by a dual mode gateway, and delaying the transmission of the service data to the dual mode gateway.

When the dual mode gateway is congested after receiving the service data, the dual mode gateway transmits the delay transmission message to the MTC server. After receiving the delay transmission message, the MTC server delays the transmission of the service data to the capillary vessel network device. The service data delayed for transmission by the MTC server may be the service data transmitted to a certain or all capillary vessel network devices connected to the congested dual mode gateway.

According to one embodiment of present disclosure, the delay transmission message may include a reaccess time evaluated for the service data by the dual mode gateway according to its congestion condition and progress in mitigation. The MTC server pauses for a period after receiving the delay transmission message, and transmits the service data to the dual mode gateway at the reaccess time.

In one embodiment of the present disclosure, the MTC server delays the data transmission to the dual mode gateway, so that the dual mode gateway has certain time to process the congested data, thereby mitigating the data congestion of the dual mode gateway, and improving the data transmission efficiency of the dual mode gateway.

Figure 5:
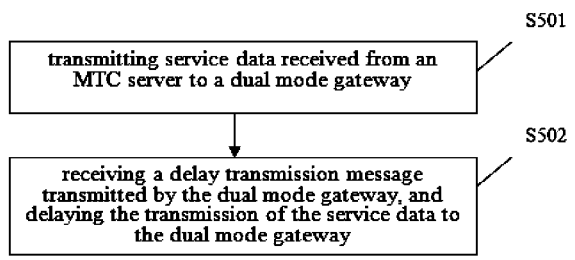
FIG. 5 is a flowchart of a gateway data transmission method according to a fifth embodiment of the present disclosure.

The gateway data transmission method according to the fifth embodiment of the present disclosure is applied to the cellular core network, as illustrated in FIG. 5, the method includes the steps of:

S501: transmitting service data received from an MTC server to a dual mode gateway.

This step has the same process as S301 in FIG. 3.

S502: receiving a delay transmission message transmitted by the dual mode gateway, and delaying the transmission of the service data to the dual mode gateway.

If the dual mode gateway is congested after receiving the service data, the dual mode gateway transmits the delay transmission message to the cellular core network. After receiving the delay transmission message, the cellular core network delays the transmission of the service data to the capillary vessel network device. The service data delayed for transmission by the cellular core network may be the service data transmitted to a certain or all capillary vessel network devices connected to the congested dual mode gateway.

According to one embodiment of present disclosure, the delay transmission message may include a reaccess time evaluated for the service data by the dual mode gateway according to its congestion condition and progress in mitigation. The cellular core network pauses for a period after receiving the delay transmission message, and transmits the service data to the dual mode gateway at the reaccess time.

In one embodiment of the present disclosure, the cellular core network delays the data transmission to the dual mode gateway, so that the dual mode gateway has certain time to process the congested data, thereby mitigating the data congestion of the dual mode gateway, and improving the data transmission efficiency of the dual mode gateway.

Figure 6:
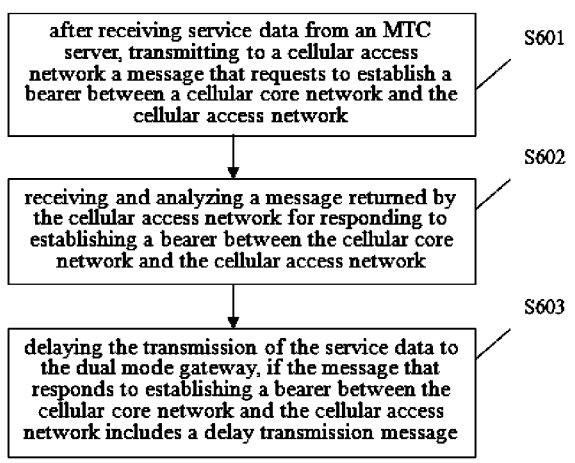
FIG. 6 is a flowchart of a gateway data transmission method according to a sixth embodiment of the present disclosure.

The gateway data transmission method according to the sixth embodiment of the present disclosure is applied to the cellular core network, as illustrated in FIG. 6, the method includes the steps of:

S601: after receiving service data from an MTC server, transmitting to a cellular access network a message that requests to establish a bearer between a cellular core network and the cellular access network.

The destination device of the service data is a capillary vessel network device connected to the dual mode gateway. The service data may be application layer data transmitted by various MTC servers to the capillary vessel network device. An MTC server transmits the service data to the cellular core network. After receiving the service data, the cellular core network transmits, to the cellular access network, a message that requests to establish a bearer therebetween, so as to notify the cellular access network that there is service data to be transmitted to the capillary vessel network device. After receiving the message that requests to establish a bearer between the cellular core network and the cellular access network, the cellular access network transmits, to the dual mode gateway, a message that requests to establish a wireless air interface bearer between the cellular access network and the dual mode gateway, so as to notify the dual mode gateway that there is service data to be transmitted to the capillary vessel network device. The dual mode gateway determines whether it is congested, after receiving the message that requests to establish a wireless air interface bearer between the cellular access network and the dual mode gateway. If congested, the dual mode gateway returns to the cellular access network a message that responds to establishing a wireless air interface bearer between the cellular access network and the dual mode gateway and that includes a delay transmission message. If not congested, the dual mode gateway returns to the cellular access network a message that responds to establishing a wireless air interface bearer between the cellular access network and the dual mode gateway and does not include a delay transmission message.

S602: receiving and analyzing a message returned by the cellular access network for responding to establishing a bearer between the cellular core network and the cellular access network.

The cellular access network receives, from the dual mode gateway, a message that responds to establishing a wireless air interface bearer between the cellular access network and the dual mode gateway. If the message that responds to establishing a wireless air interface bearer between the cellular access network and the dual mode gateway includes a delay transmission message, the cellular access network returns, to the cellular core network, a message that responds to establishing a bearer between the cellular core network and the cellular access network and that includes a delay transmission message. If the message that responds to establishing a wireless air interface bearer between the cellular access network and the dual mode gateway does not include a delay transmission message, the cellular access network returns, to the cellular core network, a message that responds to establishing a bearer between the cellular core network and the cellular access network and that does not include a delay transmission message. The cellular core network analyzes the received message that responds to establishing a bearer between the cellular core network and the cellular access network, and determines whether a delay transmission message exists therein.

S603: delaying the transmission of the service data to the dual mode gateway, if the message that responds to establishing a bearer between the cellular core network and the cellular access network includes a delay transmission message.

According to one embodiment of present disclosure, the delay transmission message may include a reaccess time evaluated by the dual mode gateway according to its congestion condition and progress in mitigation. The cellular core network pauses for a period after receiving the delay transmission message, and transmits the service data to the dual mode gateway at the reaccess time.

In one embodiment of the present disclosure, the cellular core network delays the data transmission to the dual mode gateway, so that the dual mode gateway has certain time to process the congested data, thereby mitigating the data congestion of the dual mode gateway, and improving the data transmission efficiency of the dual mode gateway.

Figure 7:
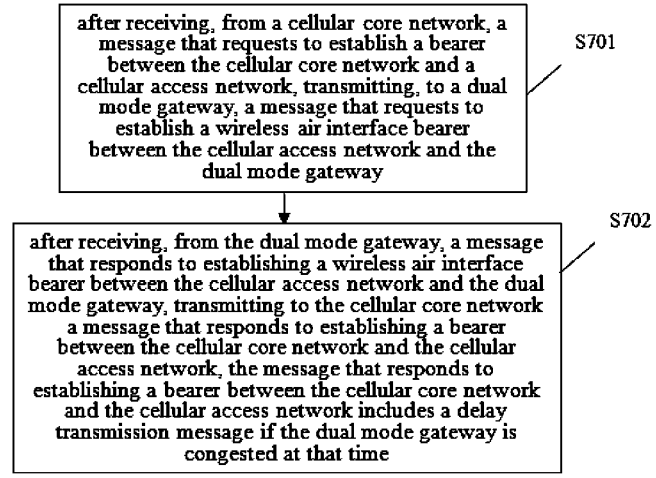
FIG. 7 is a flowchart of a gateway data transmission method according to a seventh embodiment of the present disclosure.

The gateway data transmission method according to the seventh embodiment of the present disclosure is applied to the cellular access network, as illustrated in FIG. 7, the method includes the steps of:

S701: after receiving, from a cellular core network, a message that requests to establish a bearer between the cellular core network and a cellular access network, transmitting, to a dual mode gateway, a message that requests to establish a wireless air interface bearer between the cellular access network and the dual mode gateway.

An MTC server transmits service data to the cellular core network. After receiving the service data, the cellular core network transmits, to the cellular access network, a message that requests to establish a bearer therebetween, so as to notify the cellular access network that there is service data to be transmitted to the capillary vessel network device. After receiving the message that requests to establish a bearer between the cellular core network and the cellular access network, the cellular access network transmits, to the dual mode gateway, a message that requests to establish a wireless air interface bearer between the cellular access network and the dual mode gateway, so as to notify the dual mode gateway that there is service data to be transmitted to the capillary vessel network device.

S702: after receiving from the dual mode gateway a message that responds to establishing a wireless air interface bearer between the cellular access network and the dual mode gateway, transmitting to the cellular core network a message that responds to establishing a bearer between the cellular core network and the cellular access network; and the message that responds to establishing a bearer between the cellular core network and the cellular access network includes a delay transmission message if the dual mode gateway is congested at that time.

The cellular access network receives, from the dual mode gateway, the message that responds to establishing a wireless air interface bearer between the cellular access network and the dual mode gateway. If the message that responds to establishing a wireless air interface bearer between the cellular access network and the dual mode gateway includes a delay transmission message, the cellular access network returns, to the cellular core network, a message that responds to establishing a bearer between the cellular core network and the cellular access network and that includes a delay transmission message. If the message that responds to establishing a wireless air interface bearer between the cellular access network and the dual mode gateway does not include a delay transmission message, the cellular access network returns, to the cellular core network, a message that responds to establishing a bearer between the cellular core network and the cellular access network and that does not include a delay transmission message. If the message that responds to establishing a bearer between the cellular core network and the cellular access network includes a delay transmission message, the cellular core network delays the transmission of the service data to the dual mode gateway. The delay transmission message includes a reaccess time.

According to the embodiment of present disclosure, the delay transmission message may include the reaccess time evaluated by the dual mode gateway according to its congestion condition and progress in mitigation. The cellular core network pauses for a period after receiving the delay transmission message, and transmits the service data to the dual mode gateway at the reaccess time.

In the embodiment of the present disclosure, the cellular core network delays the data transmission to the dual mode gateway, so that the dual mode gateway has certain time to process the congested data, thereby mitigating the data congestion of the dual mode gateway, and improving the data transmission efficiency of the dual mode gateway.

Figure 8:
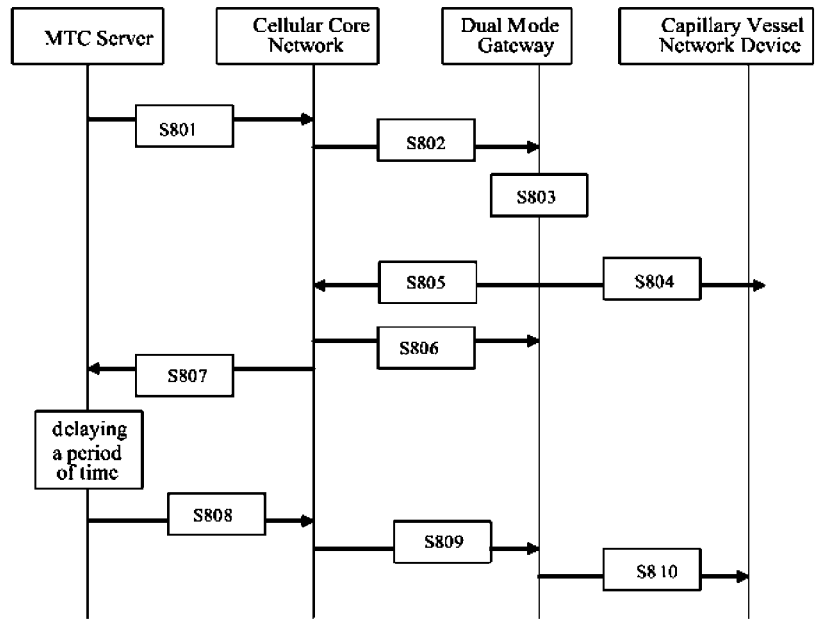
FIG. 8 is a flowchart of a gateway data transmission method according to a eighth embodiment of the present disclosure.

The gateway data transmission method according to the eighth embodiment of the present disclosure is a situation where a dual mode gateway, an MTC server and a cellular core network are applied in the same scenario, as illustrated in FIG. 8, the method includes the steps of:

S801: an MTC server transmits service data to a cellular core network.

The service data may be application layer data transmitted by various MTC servers to capillary vessel network devices.

S802: the cellular core network forwards the service data to a dual mode gateway

S803: after receiving the service data forwarded by the cellular core network, the dual mode gateway determines whether it is congested.

The mode for determining whether the dual mode gateway is congested may be determined by the administrator based on the actual conditions, and herein four preferable modes are given to determine whether the dual mode gateway is congested:

Mode 1: it is determined that the dual mode gateway is congested, if the service data is transmitted to at least one sleeping capillary vessel network device, and the buffer of the dual mode gateway is full.

Mode 2: it is determined that the dual mode gateway is congested, if the service data is transmitted to a sleeping capillary vessel network device or at least two capillary vessel network devices having the same sleeping cycle.

Mode 3: it is determined that the dual mode gateway is congested, if the service data is transmitted to at least one sleeping capillary vessel network device.

Mode 4: it is determined that the dual mode gateway is congested, if the service data is transmitted to a sleeping capillary vessel network device or at least two capillary vessel network devices having the same sleeping cycle, and the buffer of the dual mode gateway is full.

S804: if the dual mode gateway is not congested at that time, transmitting the received service data to corresponding capillary vessel network device.

S805: if the dual mode gateway is congested at that time, transmitting a delay transmission message to the cellular core network.

The delay transmission message is employed for making the MTC server delay the transmission of the service data. The delay transmission message may further include at least one of a reaccess time, relay reason and a bearer identification.

The reaccess time is a time for receiving the service data again, which is evaluated by the dual mode gateway according to its congestion condition and progress in mitigation.

The relay reason is a reason why the dual mode gateway requires delaying the transmission.

The bearer identification is a channel resource allocation identification employed for the service data from the cellular access network to the dual mode gateway.

S806: the cellular core network returns a delay transmission response message to the dual mode gateway.

S807: the cellular core network forwards the delay transmission message to the MTC server.

The order of executing S806 and S807 is not limited to the above mentioned order.

S808: the MTC server delays for a period and transmits the service data to the cellular core network.

S809: the cellular core network forwards the service data to the dual mode gateway.

S810: the dual mode gateway forwards the service data to the capillary vessel network device.

Figure 9:
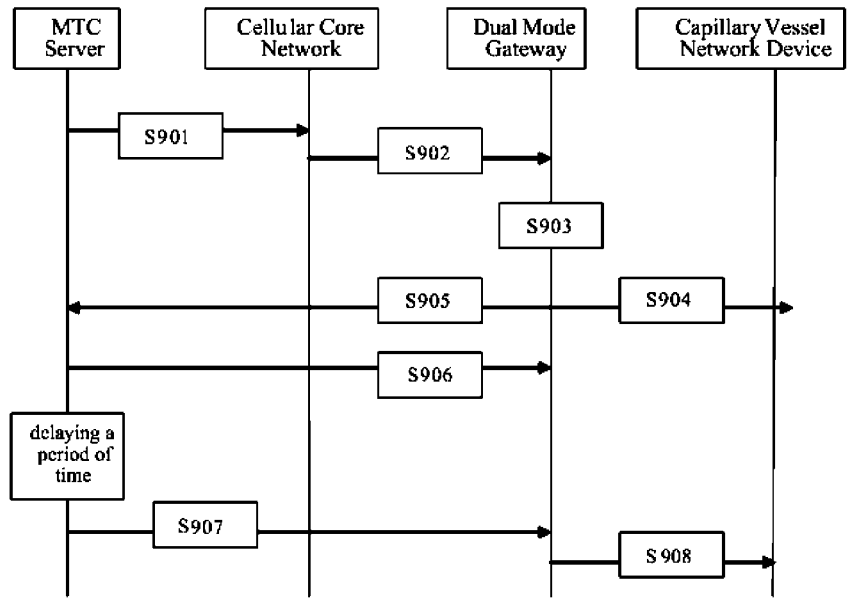
FIG. 9 is a flowchart of a gateway data transmission method according to a ninth embodiment of the present disclosure.

The gateway data transmission method according to the ninth embodiment of the present disclosure is a situation where a dual mode gateway, an MTC server and a cellular core network are applied in the same scenario, as illustrated in FIG. 9, the method includes the steps of:

S901: an MTC server transmits service data to a cellular core network.

The service data may be application layer data transmitted by various MTC servers to capillary vessel network devices.

S902: the cellular core network forwards the service data to a dual mode gateway

S903: after receiving the service data forwarded by the cellular core network, the dual mode gateway determines whether it is congested.

Please refer to the eighth embodiment for the modes for determining whether the dual mode gateway is congested.

S904: if the dual mode gateway is not congested at that time, transmitting the received service data to corresponding capillary vessel network device.

S905: if the dual mode gateway is congested at that time, transmitting a delay transmission message to the MTC server.

The delay transmission message is employed for making the MTC server delay the transmission of the service data. The delay transmission message may further include at least one of a reaccess time, relay reason and bearer identification.

The reaccess time is a time for receiving the service data again, which is evaluated by the dual mode gateway according to its congestion condition and progress in mitigation.

The relay reason is a reason why the dual mode gateway requires delaying the transmission.

The bearer identification is a channel resource allocation identification employed for the service data from the cellular access network to the dual mode gateway.

S906: the MTC server returns a delay transmission response message to the dual mode gateway.

S907: the MTC server delays for a period and transmits the service data to the dual mode gateway.

S908: the dual mode gateway forwards the service data to the capillary vessel network device.

Figure 10:
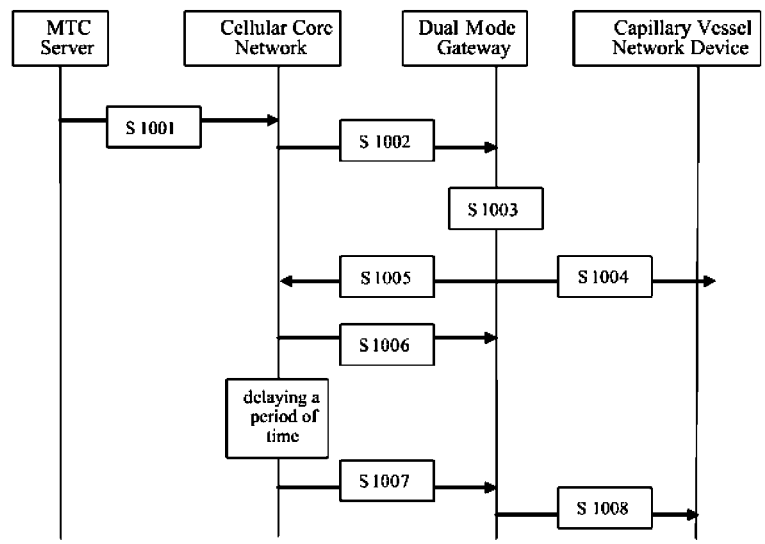
FIG. 10 is a flowchart of a gateway data transmission method according to a tenth embodiment of the present disclosure.

The gateway data transmission method according to the tenth embodiment of the present disclosure is a situation where a dual mode gateway, an MTC server and a cellular core network are applied in the same scenario, as illustrated in FIG. 10, the method includes the steps of:

S1001: an MTC server transmits service data to a cellular core network.

The service data may be application layer data transmitted by various MTC servers to capillary vessel network devices.

S1002: the cellular core network transmits the service data to a dual mode gateway.

S1003: after receiving the service data transmitted by the cellular core network, the dual mode gateway determines whether it is congested.

Please refer to the eighth embodiment for the modes for determining whether the dual mode gateway is congested.

S1004: if the dual mode gateway is not congested at that time, transmitting the received service data to corresponding capillary vessel network device.

S1005: if the dual mode gateway is congested at that time, transmitting a delay transmission message to the cellular core network.

The delay transmission message is employed for making the cellular core network delay the transmission of the service data. The delay transmission message may further include at least one of a reaccess time, relay reason and bearer identification.

The reaccess time is a time for receiving the service data again, which is evaluated by the dual mode gateway according to its congestion condition and progress in mitigation.

The relay reason is a reason why the dual mode gateway requires delaying the transmission.

The bearer identification is a channel resource allocation identification employed for the service data from the cellular access network to the dual mode gateway.

S1006: the cellular core network returns a delay transmission response message to the dual mode gateway.

S1007: the cellular core network delays for a period and transmits the service data to the dual mode gateway.

S1008: the dual mode gateway forwards the service data to the capillary vessel network device.

Figure 11:
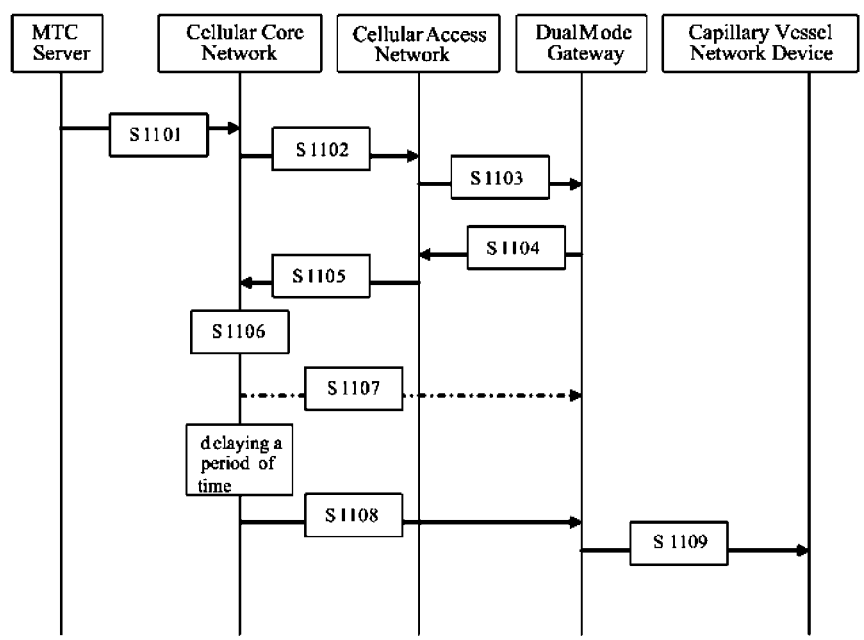
FIG. 11 is a flowchart of a gateway data transmission method according to a eleventh embodiment of the present disclosure.

The gateway data transmission method according to the eleventh embodiment of the present disclosure is a situation where a dual mode gateway, an MTC server and a cellular core network are applied in the same scenario, as illustrated in FIG. 11, the method includes the steps of:

S1101: an MTC server transmits service data to a cellular core network.

The service data may be application layer data transmitted by various MTC servers to capillary vessel network devices.

S1102: the cellular core network transmits, to a cellular access network, a message that requests to establish a bearer between the cellular core network and the cellular access network.

The message that requests to establish a bearer between the cellular core network and the cellular access network is used to notify the cellular access network that there is service data to be transmitted to the capillary vessel network device.

S1103: the cellular access network transmits, to the dual mode gateway, a message that requests to establish a wireless air interface bearer between the cellular access network and the dual mode gateway.

The message that requests to establish a wireless air interface bearer between the cellular access network and the dual mode gateway is used to notify the dual mode gateway that there is service data to be transmitted to the capillary vessel network device.

S1104: the dual mode gateway determines whether itself is congested, and returns, to the cellular access network, a message that responds to establishing a wireless air interface bearer between the cellular access network and the dual mode gateway.

If the dual mode gateway is congested, the dual mode gateway returns, to the cellular access network, a message that responds to establishing a wireless air interface bearer between the cellular access network and the dual mode gateway and that includes a delay transmission message. If the dual mode gateway is not congested, the dual mode gateway returns, to the cellular access network, a message that responds to establishing a wireless air interface bearer between the cellular access network and the dual mode gateway and that does not include a delay transmission message.

S1105: the cellular access network transmits, to the cellular core network, a message that responds to establishing a bearer between the cellular core network and the cellular access network.

The cellular access network receives, from the dual mode gateway, a message that responds to establishing a wireless air interface bearer between the cellular access network and the dual mode gateway. If the message that responds to establishing a wireless air interface bearer between the cellular access network and the dual mode gateway includes a delay transmission message, the cellular access network returns, to the cellular core network, a message that responds to establishing a bearer between the cellular core network and the cellular access network and that includes a delay transmission message. If the message that responds to establishing a wireless air interface bearer between the cellular access network and the dual mode gateway does not include a delay transmission message, the cellular access network returns, to the cellular core network, a message that responds to establishing a bearer between the cellular core network and the cellular access network and that does not include a delay transmission message.

S1106: the cellular core network receives and analyzes the message that responds to establishing a bearer between the cellular core network and the cellular access network.

The cellular core network analyzes the received message that responds to establishing a bearer between the cellular core network and the cellular access network, and determines whether a delay transmission message exists therein.

S1107: if the message that responds to establishing a bearer between the cellular core network and the cellular access network does not include a delay transmission message, the cellular core network immediately transmits the service data to the dual mode gateway.

S1108: if the message that responds to establishing a bearer between the cellular core network and the cellular access network includes a delay transmission message, the cellular core network delays the transmission of the service data to the dual mode gateway.

S1109: the dual mode gateway forwards the service data to the capillary vessel network device.

According to one embodiment of present disclosure, the delay transmission message may include the reaccess time evaluated by the dual mode gateway according to its congestion condition and progress in mitigation. The cellular core network pauses for a period after receiving the delay transmission message, and transmits the service data to the dual mode gateway at the reaccess time.

Figure 12:
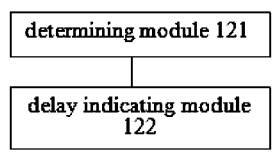
FIG. 12 is a structure diagram of a gateway data transmission device according to the first embodiment of the present disclosure.

The gateway data transmission device according to the first embodiment of the present disclosure is a dual mode gateway, as illustrated in FIG. 12, including:

A determining module 121 configured to determine whether a dual mode gateway is congested when service data from a cellular network side needs to be transmitted to a capillary vessel network device via the dual mode gateway.

The mode for determining whether the dual mode gateway is congested may be determined by the administrator based on the actual conditions, and herein four preferable modes are given to determine whether the dual mode gateway is congested:

Mode 1: it is determined that the dual mode gateway is congested, if the service data is transmitted to at least one sleeping capillary vessel network device, and the buffer of the dual mode gateway is full.

Mode 2: it is determined that the dual mode gateway is congested, if the service data is transmitted to a sleeping capillary vessel network device or at least two capillary vessel network devices having the same sleeping cycle.

Mode 3: it is determined that the dual mode gateway is congested, if the service data is transmitted to at least one sleeping capillary vessel network device.

Mode 4: it is determined that the dual mode gateway is congested, if the service data is transmitted to a sleeping capillary vessel network device or at least two capillary vessel network devices having the same sleeping cycle, and the buffer of the dual mode gateway is full.

A delay indicating module 122 configured to transmit a delay transmission message to a data transmission main body at the cellular network side when the dual mode gateway is congested, so that the data transmission main body at the cellular network side delays the transmission of the service data.

The data transmission main body at the cellular network side may be an MTC server, a cellular core network, or a cellular access network.

According to one embodiment of present disclosure, the delay transmission message includes a reaccess time evaluated for the service data by the dual mode gateway. The data transmission main body at the cellular network side pauses for a period after receiving the delay transmission message, and transmits the service data to the dual mode gateway at the reaccess time.

Please refer to the descriptions of the method embodiment for the implementations of the above functional units.

In one embodiment of the present disclosure, the dual mode gateway initiatively requires delaying the data transmission, thereby mitigating the data congestion of the dual mode gateway, and improving the data transmission efficiency of the dual mode gateway.

Figure 13:
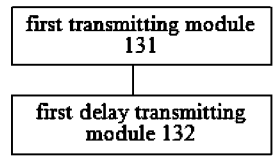
FIG. 13 is a structure diagram of a gateway data transmission device according to the second embodiment of the present disclosure.

The gateway data transmission device according to the second embodiment of the present disclosure is an MTC server, as illustrated in FIG. 13, including:

A first transmitting module 131 configured to transmit service data to a cellular core network.

The destination device of the service data is a capillary vessel network device connected to the dual mode gateway. The service data may be application layer data transmitted by various MTC servers to the capillary vessel network device. An MTC server transmits the service data to the cellular core network which, in turn, transmits the service data to corresponding dual mode gateway. Next, the dual mode gateway forwards the service data to the destination device in the capillary vessel network.

A first delay transmitting module 132 configured to receive a delay transmission message forwarded by the cellular core network, and delay the transmission of the service data to the cellular core network.

When the dual mode gateway is congested after receiving the service data, the dual mode gateway forwards the delay transmission message to the MTC server through the cellular core network. After receiving the delay transmission message, the MTC server delays the transmission of the service data to the capillary vessel network device. The service data delayed for transmission by the MTC server may be the service data transmitted to a certain or all capillary vessel network devices connected to the congested dual mode gateway.

According to one embodiment of present disclosure, the delay transmission message may include a reaccess time evaluated by the dual mode gateway according to its congestion condition and progress in mitigation. The MTC server pauses for a period after receiving the delay transmission message, and transmits the service data to the dual mode gateway at the reaccess time.

Please refer to the descriptions of the method embodiment for the implementations of the above functional units.

In one embodiment of the present disclosure, the MTC server delays the data transmission to the dual mode gateway, so that the dual mode gateway has certain time to process the congested data, thereby mitigating the data congestion of the dual mode gateway, and improving the data transmission efficiency of the dual mode gateway.

Figure 14:
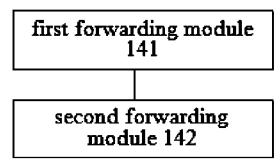
FIG. 14 is a structure diagram of a gateway data transmission device according to the third embodiment of the present disclosure.

The gateway data transmission device according to the third embodiment of the present disclosure is a cellular core network, as illustrated in FIG. 14, including:

A first forwarding module 141 configured to transmit service data received from an MTC server to a dual mode gateway.

The destination device of the service data is a capillary vessel network device connected to the dual mode gateway. The service data may be application layer data transmitted by various MTC servers to the capillary vessel network device. The cellular core network transmits the service data received from the MTC server to the dual mode gateway, and the dual mode gateway forwards the service data to the destination device in the capillary vessel network.

A second forwarding module 142 configured to receive a delay transmission message transmitted by the dual mode gateway and forward it to the MTC server.

When the dual mode gateway is congested after receiving the service data, it forwards the delay transmission message to the MTC server through the cellular core network. After receiving the delay transmission message, the MTC server delays the transmission of the service data to the capillary vessel network device.

According to one embodiment of present disclosure, the delay transmission message may include a reaccess time evaluated for the service data by the dual mode gateway according to its congestion condition and progress in mitigation. The MTC server pauses for a period after receiving the delay transmission message, and transmits the service data to the dual mode gateway at the reaccess time.

Please refer to the descriptions of the method embodiment for the implementations of the above functional units.

In one embodiment of the present disclosure, the delay transmission message is forwarded to the MTC server through the cellular core network, thus the MTC server delays the data transmission to the dual mode gateway, so that the dual mode gateway has certain time to process the congested data, thereby mitigating the data congestion of the dual mode gateway, and improving the data transmission efficiency of the dual mode gateway.

Figure 15:
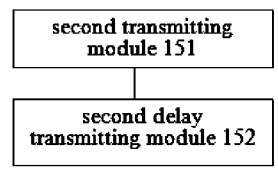
FIG. 15 is a structure diagram of a gateway data transmission device according to the fourth embodiment of the present disclosure.

The gateway data transmission device according to the fourth embodiment of the present disclosure is an MTC server, as illustrated in FIG. 15, including:

A second transmitting module 151 configured to transmit service data to a cellular core network.

This module has the same function as the first transmitting module 131.

A second delay transmitting module 152 configured to receive a delay transmission message transmitted by a dual mode gateway and delay the transmission of the service data to the dual mode gateway.

When the dual mode gateway is congested after receiving the service data, the dual mode gateway transmits the delay transmission message to the MTC server. After receiving the delay transmission message, the MTC server delays the transmission of the service data to the capillary vessel network device. The service data delayed for transmission by the MTC server may be the service data transmitted to a certain or all capillary vessel network devices connected to the congested dual mode gateway.

According to one embodiment of present disclosure, the delay transmission message may include a reaccess time evaluated for the service data by the dual mode gateway according to its congestion condition and progress in mitigation. The MTC server pauses for a period after receiving the delay transmission message, and transmits the service data to the dual mode gateway at the reaccess time.

In one embodiment of the present disclosure, the MTC server delays the data transmission to the dual mode gateway, so that the dual mode gateway has certain time to process the congested data, thereby mitigating the data congestion of the dual mode gateway, and improving the data transmission efficiency of the dual mode gateway.

Figure 16:
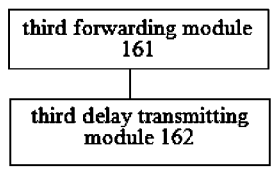
FIG. 16 is a structure diagram of a gateway data transmission device according to the fifth embodiment of the present disclosure.

The gateway data transmission device according to the fifth embodiment of the present disclosure is a cellular core network, as illustrated in FIG. 16, including:

A third forwarding module 161 configured to transmit service data received from an MTC server to a dual mode gateway, wherein the destination device of the service data is a capillary vessel network device connected to the dual mode gateway.

This module has the same function as the first forwarding module 141.

A third delay transmitting module 162 configured to receive a delay transmission message transmitted by the dual mode gateway and delay the transmission of the service data to the dual mode gateway.

When the dual mode gateway is congested after receiving the service data, the dual mode gateway transmits the delay transmission message to the cellular core network. After receiving the delay transmission message, the cellular core network delays the transmission of the service data to the capillary vessel network device. The service data delayed for transmission by the cellular core network may be the service data transmitted to a certain or all capillary vessel network devices connected to the congested dual mode gateway.

According to one embodiment of present disclosure, the delay transmission message may include a reaccess time evaluated for the service data by the dual mode gateway according to its congestion condition and progress in mitigation. The cellular core network pauses for a period after receiving the delay transmission message, and transmits the service data to the dual mode gateway at the reaccess time.

Please refer to the descriptions of the method embodiment for the implementations of the above functional units.

In one embodiment of the present disclosure, the cellular core network delays the data transmission to the dual mode gateway, so that the dual mode gateway has certain time to process the congested data, thereby mitigating the data congestion of the dual mode gateway, and improving the data transmission efficiency of the dual mode gateway.

Figure 17:
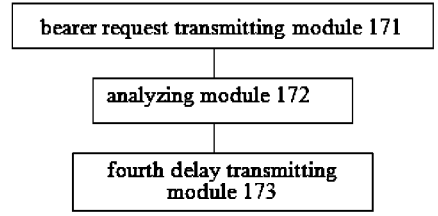
FIG. 17 is a structure diagram of a gateway data transmission device according to the sixth embodiment of the present disclosure.

The gateway data transmission device according to the sixth embodiment of the present disclosure is a cellular core network, as illustrated in FIG. 17, including:

A bearer request transmitting module 171 configured to, after receiving service data from an MTC server, transmit to a cellular access network a message that requests to establish a bearer between the cellular core network and the cellular access network.

The destination device of the service data is a capillary vessel network device connected to the dual mode gateway. The service data may be application layer data transmitted by various MTC servers to the capillary vessel network device. An MTC server transmits the service data to the cellular core network. After receiving the service data, the cellular core network transmits, to the cellular access network, a message that requests to establish a bearer therebetween, so as to notify the cellular access network that there is service data to be transmitted to the capillary vessel network device. After receiving the message that requests to establish a bearer between the cellular core network and the cellular access network, the cellular access network transmits, to the dual mode gateway, a message that requests to establish a wireless air interface bearer between the cellular access network and the dual mode gateway, so as to notify the dual mode gateway that there is service data to be transmitted to the capillary vessel network device. After receiving the message that requests to establish a wireless air interface bearer between the cellular access network and the dual mode gateway, the dual mode gateway determines whether it is congested. If congested, the dual mode gateway returns to the cellular access network a message that responds to establishing a wireless air interface bearer between the cellular access network and the dual mode gateway and that includes a delay transmission message. If not congested, the dual mode gateway returns to the cellular access network a message that responds to establishing a wireless air interface bearer between the cellular access network and the dual mode gateway and that does not include a delay transmission message.

An analyzing module 172 configured to receive and analyze a message returned by the cellular access network for responding to establishing a bearer between the cellular core network and the cellular access network.

The cellular access network receives, from the dual mode gateway, a message that responds to establishing a wireless air interface bearer between the cellular access network and the dual mode gateway. If the message that responds to establishing a wireless air interface bearer between the cellular access network and the dual mode gateway includes a delay transmission message, the cellular access network returns, to the cellular core network, a message that responds to establishing a bearer between the cellular core network and the cellular access network and that includes a delay transmission message. If the message that responds to establishing a wireless air interface bearer between the cellular access network and the dual mode gateway does not include a delay transmission message, the cellular access network returns, to the cellular core network, a message that responds to establishing a bearer between the cellular core network and the cellular access network and that does not include a delay transmission message. The cellular core network analyzes the received message that responds to establishing a bearer between the cellular core network and the cellular access network, and determines whether a delay transmission message exists therein.

A fourth delay transmitting module 173 configured to delay the transmission of the service data to the dual mode gateway, if the message that responds to establishing a bearer between the cellular core network and the cellular access network includes a delay transmission message.

According to one embodiment of present disclosure, the delay transmission message may include a reaccess time evaluated by the dual mode gateway according to its congestion condition and progress in mitigation. The cellular core network pauses for a period after receiving the delay transmission message, and transmits the service data to the dual mode gateway at the reaccess time.

Please refer to the descriptions of the method embodiment for the implementations of the above functional units.

In one embodiment of the present disclosure, the cellular core network delays the data transmission to the dual mode gateway, so that the dual mode gateway has certain time to process the congested data, thereby mitigating the data congestion of the dual mode gateway, and improving the data transmission efficiency of the dual mode gateway.

Figure 18:
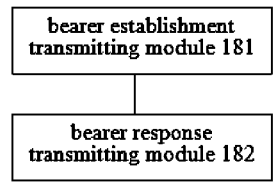
FIG. 18 is a structure diagram of a gateway data transmission device according to the seventh embodiment of the present disclosure.

The gateway data transmission device according to the seventh embodiment of the present disclosure is a cellular access network, as illustrated in FIG. 18, including:

A bearer establishment transmitting module 181 configured to, after receiving from a cellular core network a message that requests to establish a bearer between the cellular core network and a cellular access network, transmit to a dual mode gateway a message that requests to establish a wireless air interface bearer between the cellular access network and the dual mode gateway.

An MTC server transmits service data to the cellular core network. After receiving the service data, the cellular core network transmits, to the cellular access network, a message that requests to establish a bearer therebetween, so as to notify the cellular access network that there is service data to be transmitted to the capillary vessel network device. After receiving the message that requests to establish a bearer between the cellular core network and the cellular access network, the cellular access network transmits, to the dual mode gateway, a message that requests to establish a wireless air interface bearer between the cellular access network and the dual mode gateway, so as to notify the dual mode gateway that there is service data to be transmitted to the capillary vessel network device.

A bearer response transmitting module 182 configured to, after receiving from the dual mode gateway a message that responds to establishing a wireless air interface bearer between the cellular access network and the dual mode gateway, transmit to the cellular core network a message that responds to establishing a bearer between the cellular core network and the cellular access network, the message that responds to establishing a bearer between the cellular core network and the cellular access network includes a delay transmission message if the dual mode gateway is congested at that time.

The cellular access network receives, from the dual mode gateway, the message that responds to establishing a wireless air interface bearer between the cellular access network and the dual mode gateway. If the message that responds to establishing a wireless air interface bearer between the cellular access network and the dual mode gateway includes a delay transmission message, the cellular access network returns, to the cellular core network, a message that responds to establishing a bearer between the cellular core network and the cellular access network and that includes a delay transmission message. If the message that responds to establishing a wireless air interface bearer between the cellular access network and the dual mode gateway does not include a delay transmission message, the cellular access network returns, to the cellular core network, a message that responds to establishing a bearer between the cellular core network and the cellular access network and that does not include a delay transmission message. If the message that responds to establishing a bearer between the cellular core network and the cellular access network includes a delay transmission message, the cellular core network delays the transmission of the service data to the dual mode gateway.

According to one embodiment of present disclosure, the delay transmission message may include a reaccess time evaluated by the dual mode gateway according to its congestion condition and progress in mitigation. The cellular core network pauses for a period after receiving the delay transmission message, and transmits the service data to the dual mode gateway at the reaccess time.

Please refer to the descriptions of the method embodiment for the implementations of the above functional units.

In one embodiment of the present disclosure, the cellular core network delays the data transmission to the dual mode gateway, so that the dual mode gateway has certain time to process the congested data, thereby mitigating the data congestion of the dual mode gateway, and improving the data transmission efficiency of the dual mode gateway.

Figure 19:
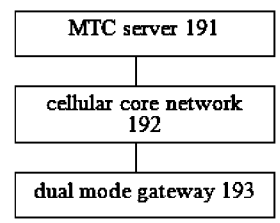
FIG. 19 is a structure diagram of a gateway data transmission system according to the first embodiment of the present disclosure.

The gateway data transmission system according to the first embodiment of the present disclosure is illustrated in FIG. 19, including:

An MTC server 191 configured to transmit service data to a cellular core network, receive a delay transmission message forwarded by the cellular core network, and delay the transmission of the service data to the cellular core network, wherein the destination device of the service data is a capillary vessel network device;

The cellular core network 192 configured to transmit the service data received from the MTC server to a dual mode gateway, and forward a delay transmission message from the dual mode gateway to the MTC server; and The dual mode gateway 193 configured to transmit a delay transmission message to the cellular core network when the service data needs to be transmitted to the capillary vessel network device via the dual mode gateway which is congested.

Please refer to the descriptions of the method embodiment for the implementations of the above functional units.

Figure 20:
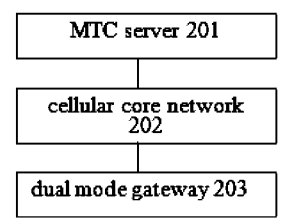
FIG. 20 is a structure diagram of a gateway data transmission system according to the second embodiment of the present disclosure.

The gateway data transmission system according to the second embodiment of the present disclosure is illustrated in FIG. 20, including:

An MTC server 201 configured to transmit service data to a cellular core network, receive a delay transmission message transmitted by a dual mode gateway, and delay the transmission of the service data to the dual mode gateway, wherein the destination device of the service data is a capillary vessel network device;

The cellular core network 202 configured to transmit the service data received from the MTC server to the dual mode gateway; and The dual mode gateway 203 configured to transmit a delay transmission message to the MTC server when the service data needs to be transmitted to the capillary vessel network device via the dual mode gateway which is congested.

Please refer to the descriptions of the method embodiment for the implementations of the above functional units.

Figure 21:
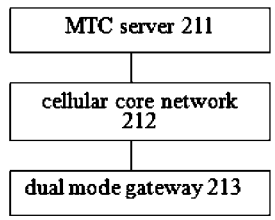
FIG. 21 is a structure diagram of a gateway data transmission system according to the third embodiment of the present disclosure.

The gateway data transmission system according to the third embodiment of the present disclosure is illustrated in FIG. 21, including:

An MTC server 211 configured to transmit service data to a cellular core network, so that the cellular core network transmits the service data to a dual mode gateway, wherein the destination device of the service data is a capillary vessel network device connected to the dual mode gateway;

The cellular core network 212 configured to transmit the service data received from the MTC server to the dual mode gateway, receive a delay transmission message transmitted by the dual mode gateway, and delay the transmission of the service data to the dual mode gateway; and The dual mode gateway 213 configured to transmit a delay transmission message to the cellular core network when the service data needs to be transmitted to the capillary vessel network device via the dual mode gateway which is congested.

Please refer to the descriptions of the method embodiment for the implementations of the above functional units.

Figure 22:
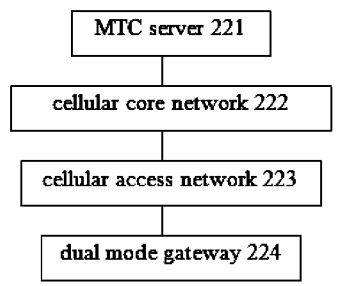
FIG. 22 is a structure diagram of a gateway data transmission system according to the fourth embodiment of the present disclosure.

The gateway data transmission system according to the fourth embodiment of present disclosure is illustrated in FIG. 22, including:

An MTC server 221 configured to transmit service data to a cellular core network, so that the cellular core network transmits the service data to a dual mode gateway, wherein the destination device of the service data is a capillary vessel network device connected to the dual mode gateway;

The cellular core network 222 configured to, after receiving the service data received from the MTC server, transmit to a cellular access network a message that requests to establish a bearer between the cellular core network and the cellular access network; receive and analyze a message returned by the cellular access network for responding to establishing a bearer between the cellular core network and the cellular access network; and delay the transmission of the service data to the dual mode gateway, if the message that responds to establishing a bearer between the cellular core network and the cellular access network includes a delay transmission message;

The cellular access network 223 configured to, after receiving from the cellular core network the message that requests to establish a bearer between the cellular core network and a cellular access network, transmit to the dual mode gateway a message that requests to establish a wireless air interface bearer between the cellular access network and the dual mode gateway; after receiving from the dual mode gateway a message that responds to establishing a wireless air interface bearer between the cellular access network and the dual mode gateway, transmit to the cellular core network the message that responds to establishing a bearer between the cellular core network and the cellular access network; and the message that responds to establishing a bearer between the cellular core network and the cellular access network includes a delay transmission message if the dual mode gateway is congested at that time; and The dual mode gateway 224 configured to receive from the cellular access network the message that requests to establish a wireless air interface bearer between the cellular access network and the dual mode gateway; transmit to the cellular access network the message that responds to establishing a wireless air interface bearer between the cellular access network and the dual mode gateway, the message that responds to establishing a wireless air interface bearer between the cellular access network and the dual mode gateway includes a delay transmission message if the dual mode gateway is congested at that time.

Please refer to the descriptions of the method embodiment for the implementations of the above functional units.

In the embodiment of the present disclosure, the system firstly determines whether the dual mode gateway is congested when the service data needs to be transmitted to the capillary vessel network device via the dual mode gateway, and transmits a delay transmission message to the data transmission main body at the cellular network side if the dual mode gateway is congested at that time, so that the data transmission main body at the cellular network side delays the transmission of the service data. Thus, by means of delaying the transmission of data to the dual mode gateway, the data congestion of the dual mode gateway is mitigated, and the data transmission efficiency of the dual mode gateway is improved.

Figure 23:
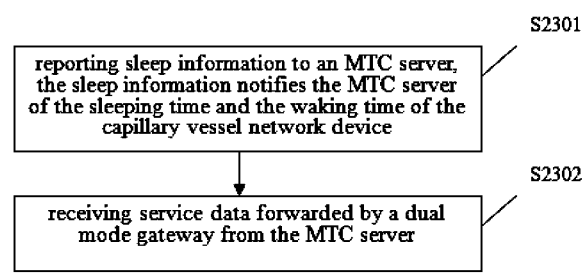
FIG. 23 is a flowchart of Embodiment 12 of a gateway data transmission method according to the twelfth embodiment of the present disclosure.

The gateway data transmission method according to the twelfth embodiment the present disclosure is applied to the capillary vessel network device, as illustrated in FIG. 23, the method includes the steps of:

S2301: reporting sleep information to an MTC server, the sleep information notifies the MTC server of the sleeping time and the waking time of the capillary vessel network device.

The sleep information may be reported to the MTC server in the manner of regular report or event-triggered report.

S2302: receiving service data forwarded by a dual mode gateway from the MTC server.

The MTC server transmits the service data to the capillary vessel network device at the waking time thereof, according to the reported sleep information.

In this method embodiment, the MTC server transmits the service data to the capillary vessel network device at the waking time thereof, according to the reported sleep information. Thus, the service data is prevented from being buffered in the dual mode gateway, which mitigates the data congestion of the dual mode gateway, and improves the data transmission efficiency of the dual mode gateway.

Figure 24:
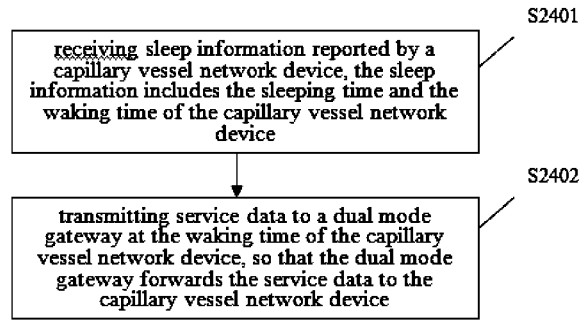
FIG. 24 is a flowchart of a gateway data transmission method according to the thirteenth embodiment of the present disclosure.

The gateway data transmission method according to the thirteenth embodiment of present disclosure is applied to the MTC server, as illustrated in FIG. 24, the method includes the steps of:

S2401: receiving sleep information reported by a capillary vessel network device, wherein the sleep information includes the sleeping time and the waking time of the capillary vessel network device.

The sleep information may be reported by the capillary vessel network device in the manner of regular report or event-triggered report.

S2402: transmitting service data to a dual mode gateway at the waking time of the capillary vessel network device, so that the dual mode gateway forwards the service data to the capillary vessel network device.

In this method embodiment, the MTC server transmits the service data to the capillary vessel network device at the waking time thereof, according to the reported sleep information. Thus, the service data is prevented from being buffered in the dual mode gateway, which mitigates the data congestion of the dual mode gateway, and improves the data transmission efficiency of the dual mode gateway.

Figure 25:
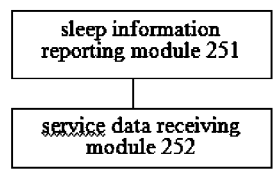
FIG. 25 is a structure diagram of a gateway data transmission device according to the eighth embodiment of the present disclosure.

The gateway data transmission device according to the eighth embodiment of the present disclosure is a capillary vessel network device, as illustrated in FIG. 25, including:

A sleep information reporting module 251 configured to report sleep information to an MTC server, the sleep information notifies the MTC server of the sleeping time and the waking time of the capillary vessel network device; and A service data receiving module 252 configured to receive service data forwarded by a dual mode gateway from the MTC server.

Please refer to the descriptions of the method embodiment for the implementations of the above functional units.

In this device embodiment, the capillary vessel network device reports the sleep information, and the MTC server transmits the service data to the capillary vessel network device at the waking time thereof, according to the reported sleep information. Thus, the service data is prevented from being buffered in the dual mode gateway, which mitigates the data congestion of the dual mode gateway, and improves the data transmission efficiency of the dual mode gateway.

Figure 26:
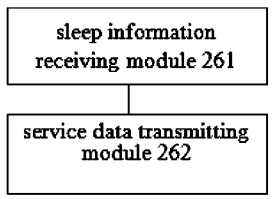
FIG. 26 is a structure diagram of a gateway data transmission device according to the ninth embodiment of the present disclosure.

The gateway data transmission device according to the ninth embodiment of the present disclosure is an MTC server, as illustrated in FIG. 26, including:

A sleep information receiving module 261 configured to receive sleep information reported by a capillary vessel network device, the sleep information includes the sleeping time and the waking time of the capillary vessel network device;

A service data transmitting module 262 configured to transmit service data to a dual mode gateway at the waking time of the capillary vessel network device, so that the dual mode gateway forwards the service data to the capillary vessel network device.

Please refer to the descriptions of the method embodiment for the implementations of the above functional units.

In this device embodiment, the MTC server transmits the service data to the capillary vessel network device at the waking time thereof, according to the reported sleep information. Thus, the service data is prevented from being buffered in the dual mode gateway, which mitigates the data congestion of the dual mode gateway, and improves the data transmission efficiency of the dual mode gateway.

Figure 27:
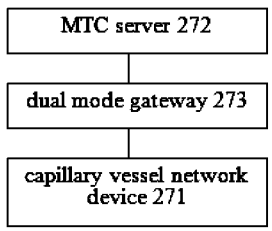
FIG. 27 is a structure diagram of a gateway data transmission system according to the fifth embodiment of the present disclosure.

The gateway data transmission system according to the fifth embodiment of the present disclosure is illustrated in FIG. 27, including:

A capillary vessel network device 271 configured to report sleep information to an MTC server, and receive service data forwarded by a dual mode gateway from the MTC server, the sleep information notifies the MTC server of the sleeping time and the waking time of the capillary vessel network device;

The MTC server 272 configured to receive the sleep information reported by the capillary vessel network device, and transmit the service data to the dual mode gateway at the waking time of the capillary vessel network device; and The dual mode gateway 273 configured to forward the service data received from the MTC server to the capillary vessel network device.

Please refer to the descriptions of the method embodiment for the implementations of the above functional units.

In the system embodiment, the capillary vessel network device reports the sleep information, and the MTC server transmits the service data to the capillary vessel network device at the waking time thereof, according to the reported sleep information. Thus, the service data is prevented from being buffered in the dual mode gateway, which mitigates the data congestion of the dual mode gateway, and improves the data transmission efficiency of the dual mode gateway.

To be noted, the cellular access network as referred to in the embodiments of the present disclosure may have different names and locations in different networks. For example, the cellular access network according to the embodiments of the present disclosure may be an eNodeB (evolved NodeB), a HeNB (Home eNodeB) or other type of base station in an Evolved UMTS Territorial Radio Access Network (E-UTRAN). Alternatively, a base station controller or a Radio Network Controller (RNC) in a UMTS Territorial Radio Access Network (UTRAN)/GSM EDGE Radio Access Network (GERAN). For the non-3GPP network, the access network entity may be an entity having the logical function of an Evolved Packet Data Gateway (ePDG) access network in a Wireless Local Area Network (WLAN), an Access Service Network Base Station (ASN BS) in a Worldwide Interoperability for Microwave Access (WiMAX) network, an entity having the logical function of a High Rate Packet Data Access Network (HRPD AN) in a Wideband Code Division Multiple Access (CDMA) network, or an entity realizing the logical function of an access network in other network.

The cellular core network as referred to in the embodiments of the present disclosure may have different names and locations in different networks. For example, the cellular core network according to the embodiments of the present disclosure may be a Mobility Management Entity (MME) connected to an E-UTRAN, or a Serving GPRS (General Packet Radio Service) Support Node (SGSN) connected to a UTRAN/GERAN. In the non-3GPP network, an Access Gateway (AGW), an entity having the logical function of the ePDG mobility management in a WLAN, an Access Service Network Gateway (ASN GW) in a Wimax network, an entity having the logical function of the HRPD AN mobility management in a CDMA network, or an entity realizing the logical function of the mobility management in other network.

A person skilled in the art shall be appreciated that all or a part of the flows implementing the method embodiments may be completed by instructing relevant hardware through a program that may be stored in a computer readable storage medium. When the program is executed, the flows of the method embodiments are carried out. The storage medium may be a magnetic disk, an optical disk, a Read-Only Memory (ROM), a Random Access Memory (RAM), etc.

The above descriptions are just some embodiments of the present disclosure, and the protection scope of the present disclosure is not limited thereto. Any change or substitution that can be easily conceived by a person skilled in the art within the technical scope disclosed by the present disclosure shall be covered by the protection scope of the present disclosure. Therefore, the protection scope of the present disclosure shall be determined by the protection scope of the claims.

What is claimed is:

1. A gateway data transmission method, the method comprising:
   determining whether a dual mode gateway is congested when service data received from a cellular network side needs to be transmitted to a capillary vessel network device via the dual mode gateway; and
   transmitting a delay transmission message to a data transmission main body at the cellular network side if the dual mode gateway is determined to be congested, so that the data transmission main body at the cellular network side delays the transmission of the service data, wherein the delay transmission message comprises a reaccess time evaluated for the service data by the dual mode gateway.

2. The method according to claim 1, wherein the data transmission main body at the cellular network side is an MTC (Machine Type Communications) server, a cellular core network, or a cellular access network.

3. The method according to claim 1, wherein the dual mode gateway is determined to be congested if the service data is transmitted to at least one sleeping capillary vessel network device and a buffer of the dual mode gateway is full.

4. The method according to claim 1, wherein the dual mode gateway is determined to be congested if the service data is transmitted to a sleeping capillary vessel network device or at least two capillary vessel network devices having the same sleeping cycle.

5. The method according to claim 1, wherein the dual mode gateway is determined to be congested if the service data is transmitted to at least one sleeping capillary vessel network device.

6. The method according to claim 1, wherein the dual mode gateway is determined to be congested if the service data is transmitted to a sleeping capillary vessel network device or at least two capillary vessel network devices having the same sleeping cycle, and a buffer of the dual mode gateway is full.

7. The method according to claim 1, wherein the delay transmission message further comprises a bearer identification and/or reason for delaying the transmission of the service data.

8. A gateway data transmission method, the method comprising:
transmitting, by a cellular core network, to a cellular access network a message that requests to establish a bearer between the cellular core network and the cellular access network, upon reception of service data from a server;
receiving and analyzing, by the cellular core network, a message returned by the cellular access network for responding to establishing a bearer between the cellular core network and the cellular access network; and
delaying, by the cellular core network, the transmission of the service data to the dual mode gateway, when the message that responds to establishing a bearer between the cellular core network and the cellular access network comprises a delay transmission message.

9. The method according to claim 8, wherein the time for delaying the transmission of the service data to the dual mode gateway is a reaccess time included in the delay transmission message.

10. A gateway data transmission method, the method comprising:
transmitting, by a cellular access network, to a dual mode gateway a message that requests to establish a wireless interface bearer between the cellular access network and the dual mode gateway, upon reception of a message that requests to establish a bearer between a cellular core network and the cellular access network from the cellular core network; and
transmitting, by the cellular access network, to the cellular core network a message that responds to establishing a bearer between the cellular core network and the cellular access network, upon reception of a message that responds to establishing a wireless interface bearer between the cellular access network and a dual mode gateway from the dual mode gateway, wherein the message that responds to establishing a bearer between the cellular core network and the cellular access network comprises a delay transmission message when the dual mode gateway is congested at that time.

11. The method according to claim 10, wherein the delay transmission message comprises a reaccess time.

12. A dual mode gateway, comprising:
a determining module configured to determine whether a dual mode gateway is congested when service data from a cellular network side needs to be transmitted to a capillary vessel network device via the dual mode gateway; and
a delay indicating module configured to transmit a delay transmission message to a data transmission main body at the cellular network side if the dual mode gateway is congested at that time, wherein the delay transmission message comprises a reaccess time evaluated for the service data by the dual mode gateway, so that the data transmission main body at the cellular network side delays the transmission of the service data.

13. The dual mode gateway according to claim 12, wherein the determining module is configured to:
determine that the dual mode gateway is congested, if the service data is transmitted to at least one sleeping capillary vessel network device and a buffer of the dual mode gateway is full; or,
determine that the dual mode gateway is congested, if the service data is transmitted to a sleeping capillary vessel network device or at least two capillary vessel network devices having the same sleeping cycle; or,
determine that the dual mode gateway is congested, if the service data is transmitted to at least one sleeping capillary vessel network device; or,
determine that the dual mode gateway is congested, if the service data is transmitted to a sleeping capillary vessel network device or at least two capillary vessel network devices having the same sleeping cycle, and the buffer of the dual mode gateway is full.

14. A cellular core network, comprising:
a bearer request transmitting module configured to transmit to a cellular access network a message that requests to establish a bearer between the cellular core network and the cellular access network upon reception of service data from a server;
an analyzing module configured to receive and analyze a message returned by the cellular access network for responding to establishing a bearer between the cellular core network and the cellular access network; and
a delay transmitting module configured to delay the transmission of the service data to the dual mode gateway, when the message that responds to establishing a bearer between the cellular core network and the cellular access network comprises a delay transmission message.

15. A cellular access network, comprising:
a bearer establishment transmitting module configured to transmit to a dual mode gateway a message that requests to establish a wireless interface bearer between the cellular access network and the dual mode gateway, upon reception of a message that requests to establish a bearer between a cellular core network and the cellular access network from the cellular core network; and
a bearer response transmitting module configured to transmit to the cellular core network a message that responds to establishing a bearer between the cellular core network and the cellular access network, upon reception of a message that responds to establishing a wireless interface bearer between the cellular access network and the dual mode gateway from the dual mode gateway, wherein the message that responds to establishing a bearer between the cellular core network and the cellular access network comprises a delay transmission message if the dual mode gateway is congested at that time.

* * * * *